United States Patent [19]

Lowell et al.

[11] 4,401,813

[45] Aug. 30, 1983

[54] PROCESS FOR PREPARING ALKALI METAL SALT OF CARBOXYMETHYL CELLULOSE

[75] Inventors: Jack L. Lowell; Michael J. Nevins; Kenneth I. G. Reid, all of Houston; Kenneth L. Walter, The Woodlands, all of Tex.

[73] Assignee: NL Industries, Inc., New York, N.Y.

[21] Appl. No.: 331,299

[22] Filed: Dec. 10, 1981

[51] Int. Cl.$^3$ .............................................. C08G 59/00
[52] U.S. Cl. .................................. 536/98; 252/8.5 C
[58] Field of Search .......................................... 536/98

[56] References Cited

U.S. PATENT DOCUMENTS

| | | | |
|---|---|---|---|
| 2,425,768 | 8/1947 | Wagner | 252/8.5 C |
| 2,536,113 | 1/1951 | Wagner | 252/8.5 C |
| 3,088,943 | 5/1963 | Cordrey et al. | 536/98 |
| 3,284,441 | 11/1966 | Bishop et al. | 536/98 |
| 3,498,971 | 3/1970 | Blaga et al. | 536/98 |
| 3,954,628 | 5/1976 | Sauber et al. | 252/8.5 A |
| 4,063,018 | 12/1977 | Ohnaka et al. | 536/98 |

*Primary Examiner*—A. Lionel Clingman
*Attorney, Agent, or Firm*—Browning, Bushman, Zamecki & Anderson

[57] ABSTRACT

A process for preparing a form of carboxymethyl cellulose which exhibits superior rheological and fluid loss characteristics in aqueous calcium chloride solutions which comprises conducting causticization of high molecular weight cellulose in the absence of oxygen, at a temperature less than 350° C., in an aqueous solution containing 86.9±2% by weight isopropanol, at an isopropanol-water solution to cellulose weight ratio from 2 to 1 to 7.5 to 1, and in the presence of sufficient alkali metal hydroxide such that the alkali metal hydroxide to monochloroacetic acid molar ratio during the subsequent etherification of the alkali cellulose is greater than 2.00 to 1, wherein the monochloroacetic acid utilized contains less than about 2% by weight dichloroacetic acid.

9 Claims, No Drawings

PROCESS FOR PREPARING ALKALI METAL SALT OF CARBOXYMETHYL CELLULOSE

BACKGROUND OF THE INVENTION

The present invention relates to a process for the preparation of alkali metal salts of carboxymethyl cellulose, sometimes referred to in the literature as alkali metal cellulose glycolates. The alkali metal salts of carboxymethyl cellulose, hereinafter sometimes referrd to as "CMC", prepared utilizing the process of this invention possess enhanced viscosity and fluid loss control characteristics when disposed in an aqueous medium containing calcium ions dissolved therein.

Cellulose is a linear polymer of $\beta$-anhydroglucose units. Each anhydroglucose unit contains three hydroxyl groups. CMC is prepared by the reaction of some of the cellulose hydroxyls with sodium monochloroacetate, using sodium to illustrate the alkali metal, or monochloroacetic acid as follows:

Sodium Monochloroacetate

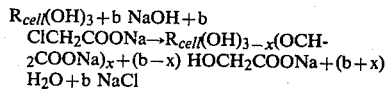

Monochloroacetic Acid

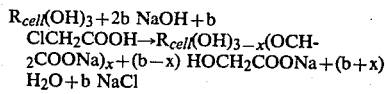

where b indicates reaction stoichiometry and x indicates the DS achieved in the reaction. The extent of the reaction of cellulose hydroxyls to form a derivative is called the "degree of substitution" (DS) and is defined as the average number of the three hydroxyl groups in the anhydroglucose unit which have reacted. Commercial products have DS values ranging from about 0.4 to about 1.4. The most common grade has a DS of 0.7 to about 0.8.

CMC is commercially available in several different viscosity grades ranging from about 4500 centipose (cp) in a 1% solution of CMC in deionized water to about 10 cp in a 2% solution. The various viscosity grades correspond to products having molecular weights from about 1,000,000 to about 40,000.

Alkali metal or ammonium salts of carboxymethyl cellulose are water-soluble polymers. If calcium ion is present at a concentration normally found in hard water, these salts of carboxymethyl cellulose will not normally develop their full viscosity. At higher calcium ion concentration, CMC precipitates from solution. CMC is, however, more tolerant of alkali metal ions in solution than are many other water-soluble polymers. The tolerance is greater if the cation is added to a CMC solution than if CMC is added to a cation solution.

The commercial production of CMC involves treatment of cellulose with aqueous sodium hydroxide followed by reaction with sodium chloroacetate or monochloroacetate acid. A side reaction also occurs whereby the sodium chloroacetate reacts with sodium hydroxide to give sodium glycolate and sodium chloride. Cellulose is a fibrous solid. Chemical cellulose which is useful for the manufacture of CMC is derived from cotton linters or wood pulp. To obtain uniform reaction, it is essential that all the fibers be wetted with the aqueous NaOH. One process for accomplishing this is to steep sheeted cellulose in aqueous NaOH, and then press out the excess. The sheets are then shredded and the sodium chloroacetate is added. Reactions are generally conducted at 50° to 70° C. In some cases, a greater amount of NaOH is added, and the monochloroacetic acid is added as such, the sodium salt being formed in the presence of the cellulose.

Alternative processes have been developed wherein the steeping and pressing steps are eliminated by conducting the reaction in the presence of an inert water-miscible diluent such as tertiary butyl alcohol, acetone, or isopropanol. At the end of the reaction, the excess alkali is neutralized and the crude product, which contains sodium chloride and sodium glycolate, may be purified depending on the quality of the product desired.

The following U.S. Pat. Nos. disclose various processes for preparing CMC: Maxwell 2,148,952; Klug et al. 2,512,338; Lamborn 2,513,807; Rigby 2,607,772; Miller 2,715,124; Miller 2,839,526; Henry et al. 3,069,409; Henry et al. 3,085,087; Cordrey et al. 3,088,943; Bishop et al. 3,284,441; Blaga et al. 3,498,971; and Ohnaka et al. 4,063,018.

One of the most desirable properties of CMC for a wide variety of uses is its ability to impart viscosity and other special rheological properties to aqueous solutions. Most solutions of CMC are pseudoplastic. Most products having a DS value below about 1.0 are also thixotropic. Thixotropy, or the lack of it, is a function not only of the degree of substitution, but also of the uniformity of substitution. Solution properties can be changed from thixotropic to non-thixotropic with no change in DS by special reaction schedules and raw material selections. Uniformity of substitution also increases tolerance to acid systems and dissolved ions. The presence of salts in solution represses the disaggregation of CMC and therefore affects the viscosity and other properties.

In the drilling, mining, and other industries, drilling fluids are used to: carry the cuttings to the surface; clean and cool the drill bit; reduce friction between the drill string and the sides of the borehole; maintain the stability of uncased sections of the borehole; prevent the inflow of fluids from the formations penetrated; and form a thin, low permeability filter cake on the sides of the borehole to prevent or decrease the loss of fluid from the drilling fluid to the formations penetrated.

In order to prevent formation fluids from entering the borehole, the hydrostatic pressure of the mud column must be greater than the pressure of the fluids in the formation. As a result, drilling fluids tend to invade the permeable formations. Solids in the drilling fluid are filtered out into the walls of the hole, forming a cake of relatively low permeability, through which only filtrate can pass. Drilling fluids must be treated to keep the cake permeability as low as possible in order to maintain a stable borehole and to minimize filtrate invasion of, and damage to, potentially productive formations. High cake permeability result in thick filter cakes which cause many problems.

CMC has been used for many years to reduce the filter loss, i.e. the volume of filtrate, of aqueous drilling fluids. Many cations such as potassium and calcium are advantageously present in drilling fluis to help stabilize the sides of the borehole and to prevent excessive breakdown of the cuttings before they are removed from the borehole. However, the presence of multivalent cations drastically affects the filtration characteristics of the drilling fluids just as they affect the rheological properties as discussed hereinbefore.

The following U.S. Pat. Nos. discuss the use of CMC in drilling fluids: Wagner 2,425,768; Wagner 2,536,113; Fisher 2,606,151; Frint 2,957,822; Gidley et al. 3,076,758; and Sauber et al. 3,954,628.

Thus there is a need for an additive for use in decreasing the fluid loss of drilling fluids containing calcium ions. There is also a need for an additive for use in increasing the viscosity of aqueous fluids containing calcium ions.

SUMMARY OF THE INVENTION

It is an object of this invention to provide a process for the manufacture of CMC which possesses enhanced stability in aqueous solutions containing calcium ions.

It is another object of this invention to provide a CMC which possesses enhanced rheological characteristics in aqueous fluids containing calcium ions.

It is still another object of this invention to provide aqueous compositions containing calcium ions, particularly adapted for use as well working compositions, which possess enhanced rheological characteristics.

A further object of this invention is to provide a process for the manufacture of CMC which possesses enhanced fluid loss control characteristics in aqueous fluids containing calcium ions.

We have discovered that CMC possessing improved rheological properties in $CaCl_2$ solutions can be prepared by a wetted-solid process in which the causticization of the cellulose is conducted in an oxygen-reduced atmosphere at a temperature less than about 35° C. in a dispersant comprising an azeotropic mixture of isopropyl alcohol (isopropanol) and water while the cellulose is intensively sheared at a solvent to cellulose weight ratio in the range from 2/1 to 7.5/1.

The process thus consists of: (1) removing oxygen from the reaction vessel; (2) intensively shearing a mixture of cellulose and an azeotropic solution of isopropanol and water (at 29 inches of mercury vacuum, i.e., 86.9% isopropanol, 13.1% water hereinafter sometimes referred to as azeotrope) at an azeotrope to cellulose weight ratio of from about 2/1 to about 7.5/1; (3) adding solid sodium hydroxide at a rate sufficient to maintain the temperature less than about 35° C.; (4) optionally cooling the reactor in steps (2) and (3) to maintain the reaction temperature less than 35° C. and to allow a faster rate of addition of the sodium hydroxide; (5) continuing the shearing and cooling for a period of time sufficient to react the sodium hydroxide and cellulose and produce alkali cellulose; (6) adding monochloroacetic acid; and (7) heating the reaction mixture to a temperature in the range of from about 55° C. to about 90° C. for a period of time sufficient to form the carboxymethyl cellulose ether.

Optionally the concentration of water in the isopropanol-water solution in step (2) can be less than that required to form the azeotrope, and a solution of sodium hydroxide in water can be added in step (3) provided that the combined concentration of isopropanol and water added in steps (2) and (3) is such that the azeotrope is formed and is present thereafter in steps (4) and (5).

Also optionally, the solid sodium hydroxide can be mixed with the azeotrope and added as such in step (3) provided that the azeotrope/dry cellulose ratio is maintained in the required range of from about 2/1 to about 7.5/1, preferably from about 3/1 to about 6/1.

The product obtained by the process of this invention is characterized as having enhanced rheological and fluid loss control properties in aqueous systems containing soluble calcium salts and having a pH less than about 10. The preferred products obtained by the process of this invention have a drilling fluid yield as defined in the Glossary of Drilling-Fluid and Associated Terms, API BUL D11, First Edition, December 1965, of at least 850 bbl./ton, most preferably at least 950 bbl./ton, when evaluated in a 4% $CaCl_2$ solution. A drilling fluid yield of X bbl./ton indicates that one ton of CMC will product X bbl. of a drilling fluid having an apparent viscosity of 15 cp as measured by American Petroleum Institute Procedure RP 13B.

DESCRIPTION OF PREFERRED EMBODIMENTS

In practicing the process of this invention, the cellulose starting material is added to an isopropanol-water solution in a suitable reaction vessel and intensively sheared and agitated to wet the cellulose. The vessel is then evacuated to remove air (oxygen) from the vessel and the vessel is pressurized with an inert (non-oxygen containing) gas, preferably nitrogen. It is preferred that the reaction vessel be capable of; (1) being heated and cooled, such as by passing a fluid through a jacket surrounding the interior of the vessel; (2) being evacuated and pressurized; and (3) imparting high shear and agitation to the cellulose at the desired cellulose concentration.

The amount of the isopropanol-water solution utilized is such that the combined total amount of isopropanol and water added throughout the etherification process is sufficient to provide a weight ratio of isopropanol-water solution to dry cellulose of from about 2 to 1 to about 7.5 to 1. The combined total amount of isopropanol and water includes the isopropanol and water added initially as well as any isopropanol and water added with the alkali metal hydroxide and the monochloroacetic acid.

Thereafter the cellulose is causticized by adding a suitable alkali metal hydroxide, preferably sodium hydroxide, while maintaining the temperature less than about 35° C. It is critical in the process of this invention that the concentration of isopropanol in the isopropanol-water solution during caustization of the cellulose be 86.9±2% by weight, preferably from about 85% to about 88%. The causticization of the cellulose is conducted for a period of time sufficient to form the alkali cellulose. Generally, causticization will be complete after about 30 minutes from the time when all alkali metal hydroxide has been added, although longer alkalization times can be utilized. The temperature may be maintained less than about 35° C. by controlling the rate of addition of the sodium hydroxide, circulating water or other fluid through the jacket of the reaction vessel, if present, and periodically evacuating the vessel thus evaporating a portion of the isopropanol-water solution (evaporative cooling).

Monochloroacetic acid (hereinafter sometimes referred to as MCA) is added to the alkali cellulose and the temperature is raised to the range of from about 55° C. to about 90° C. for a period of time sufficient to convert all of the MCA to the carboxymethyl cellulose ether and to alkali metal glycolate. Generally a reaction time of 30 minutes is sufficient although longer times can be utilized. The MCA is conveniently added to the vessel in the form of a solution in water or in an isopropanol-water solution.

Subsequently the isopropanol and water are removed from the CMC and the CMC is pulverized to form the novel viscosifiers of this invention. Preferably the isopropanol is removed from the CMC by heating and evacuating the reaction vessel and collecting the azeotrope for re-cycling in the process. The water wet CMC remaining can then be dried to obtain a moisture content less than about 15% by weight, preferably from about 5% to about 10%. Alternatively, the water wet CMC, after removing the azeotropic solution of isopropanol and water, can be sprayed with water to increase the moisture content of the CMC to about 40% to about 65% by weight. Subsequent drying and pulverizing of this water wet CMC produces a more dense product which is easier to handle. It is preferred that additional water be added to the reaction vessel before removing the azeotropic solution from the vessel. This keeps the CMC in a relatively free-flowing, non-dusting state during azeotrope removal thus preventing dust carryover with the azeotrope vapor. It also prevents excessive mechanical stress on the reactor mixer elements, and also facilitates product discharge from the vessel. The amount of additional water added before azeotrope removal is such that the water wet CMC remaining after azeotrope removal will contain from about 20% to about 30% by weight water.

Purified grades of CMC can be prepared, if desired, by washing the CMC with aqueous alcohol solutions, preferably methanol, of about 75% by weight, to remove the alkalimetal chloride and alkalimetal glycolate from the CMC.

The amount of alkali used is varied depending upon the desired degree of substitution (D.S.) of carboxymethyl groups on the cellulose; however, the alkali metal hydroxide to monochloroacetic acid molar ratio must be greater than 2 to 1 to obtain CMC having the superior rheological characteristics in calcium chloride solution as required by this invention.

For a technical grade CMC in which the by-products of the reaction remain in the product, it is preferred that the molar ratio of the cellulose (dry): alkalimetal hydroxide: MCA be in the range from 1:1.725–2.415:0.85–1.15 and that the molar ratio of alkalimetal hydroxide to MCA be in the range from about 2.03 to 1 to 2.1 to 1. The upper limit on the caustic to MCA ratio is necessary since the excess caustic will raise the pH of the aqueous solutions to which the technical grade CMC is added. As will be explained hereinafter, the superior viscosity characteristics of the CMC of this invention in calcium chloride solutions is dependent upon the pH of the solutions.

For a purified grade of CMC in which the by-product of the reaction and the neutralized excess caustic have been removed from the product, there is no upper limit on the molar ratio of alkalimetal hydroxide to MCA although excessive amounts are wasteful and costly. For purified grades, the molar ratio of dry cellulose: MCA can be greater than for technical grade CMC, such as from about 1:0.85 to about 1:1.5.

The monochloroacetic acid used in the process of this invention must not contain greater than about 2% by weight of dichloroacetic acid. Larger amounts of dichloroacetic acid in the MCA produce a CMC having reduced rheological and fluid loss characteristics in calcium chloride solutions.

As noted, it is critical in practicing the process of this invention to conduct the causticization of the cellulose in the absence of oxygen, at a temperature less than about 35° C., in an aqueous solution containing from 84.9% to 88.9% isopropanol, at an isopropanol-water solution to cellulose weight ratio from 2 to 1 to 7.5 to 1, and in the presence of sufficient alkali metal hydroxide that the alkali metal hydroxide to MCA molar ratio during the etherification of the alkali cellulose is greater than 2.00 to 1. For unpurified CMC, the molar ratio of alkali metal hydroxide to MCA must not exceed 2.1 to 1. Additionally, the monochloroacetic acid must not contain greater than 2% by weight of dichloroacetic acid. This combination of variables combine to produce a CMC which exhibits enhanced rheological and fluid loss characteristics in aqueous calcium chloride solutions. Such solutions are of value as drilling, workover and completion fluids in the oil and gas industry.

The concentration of isopropanol in the solution initially charged to the reactor is advantageously greater than that required to form the azeotrope, i.e. greater than 86.9% by weight, provided that additional water is later added such that the required amount of water is present during the causticization of the cellulose (11.1% to 15.1% by weight water preferably 12% to 15%).

The CMC produced by the process of this invention is characterized as having superior rheological characteristics in aqueous calcium chloride solutions at a pH less than about 10.0 as will be indicated in the following examples of the invention. The CMC will have a yield of at least 850 barrels (42 gallons/barrel) of 15 cp fluid containing 4% by weight calcium chloride per ton (2000 pounds) of CMC, preferably at least 950 barrels/ton. The CMC at a concentration of 2 pounds per 42 gallon barrel (ppb.) in 4% by weight calcium chloride solution will produce a fluid having an apparent viscosity of at least 10 cp.

The invention is illustrated by the following non-limiting examples.

The reaction vessel utilized in conducting the following examples consisted of a jacketed vessel capable of use at high temperatures and pressures ranging from full vacuum to 75 psig. The mixing of ingredients was accomplished by means of four ploughs connected to a horizotal shaft and one chopper (a whirling blade with its shaft perpendicular to the horizontal shaft). This type of reactor allows intensive mixing and chemical reaction at much higher solids to liquid ratios than are possible in most other types of reactions. Such reactors are sold commercially by Littleford Bros., Inc., Florence, Ky.

The CMC manufacturing process consisted of the following steps unless otherwise indicated:

(1) The desired amount of cellulose and isopropanol solution were added to the vessel and mixed intensively for 15 to 20 minutes while circulating cooling water through the jacket;

(2) The vessel was evacuated to 28 to 29 inches of mercury and thereafter pressurized with nitrogen while mixing;

(3) The desired amount of sodium hydroxide, either 99% solid prills or a 48%–50% aqueous solution, was added at a controlled rate to keep the causticization reaction temperature below about 95° F. (35° C.) while mixing;

(4) The causticization reaction was allowed to continue for 20 to 90 minutes at a temperature less than about 95° F. while mixing;

(5) Monochloroacetic acid was added while mixing either as a 50% solution in azeotrope or as an 80% aqueous solution, and the temperature was allowed to increase due to the heat of reaction;

(6) The vessel was heated by circulating hot water through the jacket and the etherification reaction was conducted at a temperature in the range of from about 148° F. to about 170° F. for a period of from about 30 to about 40 minutes, while mixing;

(7) The isopropanol/water azeotrope was distilled from the vessel under a vacuum of 29 inches of mercury (86.9% isopropanol, 13.1% water, by weight); and (8) Thereafter the CMC, which contains from about 15% to 25% water was dried to a moisture content less than 15%, preferably from about 5% to about 10% moisture.

The cellulose utilized in the examples was a high molecular weight, purified grade of cotton linters obtained from the Buckeye Cellulose Corp., ER 4500, in the form of sheets, chips (about 0.25"×0.25"), flakes, and the like.

The monochloroacetic acid utilized was obtained from American Hoerhst, and contained a maximum of 0.5% by weight of dichloroacetic acid.

EXAMPLE 1A 17.3 pounds of Buckeye Cellulose Corp. cotton linter chips ER 4500 (99% alpha cellulose), containing 6.4% water were mixed with 81 pounds of a solution containing 86.9% isopropanol and 13.1% by weight (azeotrope) water for 19 minutes at a temperature in the range from 57° to 66° F. The vessel was evacuated to 29" mercury and pressurized with nitrogen to 3 atmospheres while mixing for 8 minutes. 8.2 lb. of sodium hydroxide beads were added while mixing and cooling for 13 minutes at a temperature in the range of from 60° to 75° F. The causticization reaction was than conducted for 47 minutes while mixing at a temperature in the range of from 59° to 68° F. Monochloroacetic acid was added as a 50% solution (azeotrope) over a mixing period of 18 minutes during which the temperature increased to 114° F. The batch was heated to 150° F. in 9 minutes and the etherification reaction conducted at a temperature in the range from 150° F. to 160° F. for 33 minutes, while mixing. Thereafter the azeotrope was removed under 29" Hg vacuum at a temperature from 110° F. to 196° F., and the CMC dried at 150°-180° F. to a moisture content of 8.2%. Analysis of this technical grade CMC showed a D.S. of 0.87 and a purity of 77.6% dry basis. It contained 17.1% sodium chloride and 5.6% sodium glycolate, dry basis. The reaction was conducted at a molar ratio of cellulose:NaOH:MCA of 1:2.03:1.

EXAMPLE 1B

The CMC produced in Example 1A was washed with an 80% methanol solution (20% by weight water) to remove the sodium chloride and sodium glycolate by-products, thus producing a purified grade of CMC.

EXAMPLE 2

A procedure similar to Example 1A was conducted utilizing Buckeye Cellulose Corp. purified cotton linters in flake form.

COMPARATIVE EXAMPLE A AND B

A procedure similar to Example 1A was conducted utilizing the same cellulose in pulp form and in the form of a floc obtained by milling the chips of Example 1A through a Raymond mill having a 0.125 inch screen.

EXAMPLE 3

A procedure similar to Example 1A was conducted at a molar ratio of cellulose:NaOH:MCA of 1:2.05:1.

COMPARATIVE EXAMPLE C

A procedure similar to Example 3 was followed except that the concentration of isopropanol in the isopropanol/water mixture initially added to the vessel was 77.0% by weight.

COMPARATIVE EXAMPLE D

A procedure similar to Example 3 was followed except that the concentration of isopropanol in the isopropanol/water solution originally added to the vessel was 94.0% by weight.

COMPARATIVE EXAMPLE E

A procedure similar to Example 3 was followed except that the sodium hydroxide was added to the reactor as a 50% solution in water which resulted in a isopropanol/water concentration of 84.5%/15.5% in the reactor during the causticization reaction.

EXAMPLE 4

A procedure similar to Example 3 was followed except that the concentration of isopropanol in the solution initially added to the vessel was 85.4%, and the causticization time was 960 minutes.

EXAMPLE 5

A procedure similar to Example 1A was followed except that the concentration of isopropanol in the solution initially added to the vessel was 94.6% by weight and the sodium hydroxide was added to the reactor as a 50% solution in water, resulting in an isopropanol/water concentrations of 86.9%/13.1% (azeotrope) in the reactor during the causticization reaction.

EXAMPLE 6

A procedure similar to Example 1A was followed except that the MCA was added to the reaction vessel as an aqueous solution containing 20% water.

EXAMPLE 7

A procedure similar to Example 5 was followed except that the MCA was added to the reaction vessel as an aqueous solution containing 20% water.

COMPARATIVE EXAMPLE F

A procedure similar to Example 1A was conducted at a molar ratio of cellulose:NaOH:MCA of 1:2.0:1. The CMC had a D.S. of 0.72.

COMPARATIVE EXAMPLE G

A procedure similar to Example 1A was repeated except that the temperature was allowed to increase to 124° F. during the causticization reaction.

EXAMPLE 8

A procedure similar to Example 3 was repeated except that the temperature was allowed to increase to 87°

F. during the causticization reaction. The CMC had a D.S. of 0.74.

COMPARATIVE EXAMPLE H

A procedure similar to Example 1A was repeated except that the vessel was not evacuated and pressurized with nitrogen, i.e., it was conducted in the presence of air at atmospheric pressure.

These CMC samples were evaluated as viscosifiers at a concentration of 2 pounds per 42 gallon barrel (2 ppb.) at a comparable moisture content of 8%, in an aqueous solution containing 4% calcium chloride by weight.

All percentages of components are by weight unless otherwise indicated. The reaction conditions for all of the above examples are given in Table 1 and the form of the materials used in the examples are given in Table 2.

evaluated in a 4% calcium chloride solution, when produced by the process of this invention, is sufficient for use in preparing the superior CMC viscosifiers of this invention;

(2) Examples 1A, 4, C, D, E—The concentrations of isopropanol and water in the reaction medium during the causticization of the cellulose is critical and must be controlled to 86.9±2% by weight isopropanol;

(3) Examples 1A, 5, 6, 7—The concentration of isopropanol in the isopropanol-water solution before causticization should be maximized for best results;

(4) Examples 1A, 3, F—The molar ratio of sodium hydroxide to monochloroacetic acid must be greater than 2 to 1 to obtain superior rheological characteristics in calcium chloride solutions;

(5) Examples 1A, 8, G—The temperature during the causticization of the cellulose must be kept below about

TABLE 1

| Example No. | Cellulose/Alcohol Mixing | | Reactor Evacuation | | Nitrogen Addition | | NaOH Addition | | Causticization | | MCA Addition | | Heating | | Etherification | |
|---|---|---|---|---|---|---|---|---|---|---|---|---|---|---|---|---|
| | Time Min. | Temp. °F. | Time Min. | Vacuum In. Hg. | Time Min. | Pressure Atm. | Time Min. | Temp. °F. | Time Min. | Temp. °F. | Time Min. | Temp. °F. | Time Min. | Temp. °F. | Time Min. | Temp. °F. |
| 1 | 19 | 57–66 | 5 | 29 | 3 | 1 | 13 | 60–75 | 47 | 59–68 | 18 | 64–114 | 9 | 150 | 33 | 150–160 |
| 2 | 15 | 61–80 | 2 | 29 | 6 | 1 | 14 | 61–69 | 45 | 58–75 | 21 | 74–118 | 11 | 150 | 31 | 150–163 |
| 3 | 15 | 56–78 | 3 | 28.5 | 4 | 1 | 15 | 58–86 | 42 | 61–87 | 16 | 62–124 | 12 | 151 | 29 | 148–169 |
| 4 | 16 | 46–67 | 1 | 29 | 5 | 1 | 13 | 47–71 | 960 | 58–77 | 15 | 77–118 | 8 | 152 | 31 | 152–164 |
| 5 | 16 | 58–66 | 2 | 29 | 3 | 1 | 16 | 55–72 | 27 | 57–70 | 13 | 68–110 | 9 | 150 | 31 | 150–162 |
| 6 | 15 | 64–79 | 2 | 28 | 8 | 1 | 12 | 58–68 | 54 | 60–72 | 13 | 72–106 | 8 | 150 | 30 | 150–161 |
| 7 | 15 | 59–77 | 5 | 28 | 4 | 3 | 19 | 57–64 | 44 | 57–71 | 10 | 65–98 | 10 | 150 | 30 | 150–160 |
| 8 | 15 | 63–73 | 4 | 29 | 7 | 1 | 13 | 62–70 | 42 | 61–87 | 10 | 87–123 | 12 | 150 | 30 | 150–160 |
| A | 16 | 55–74 | 4 | 29 | 6 | 1 | 11 | 50–71 | 39 | 59–71 | 22 | 71–122 | 4 | 151 | 31 | 151–162 |
| B | 85 | 49–54 | 2 | 29 | 3 | 1 | 10 | 53–75 | 31 | 62–73 | 21 | 73–114 | 6 | 150 | 32 | 150–160 |
| C | 18 | 52–73 | 2 | 29 | 3 | 1 | 15 | 48–71 | 38 | 57–69 | 13 | 57–73 | 19 | 151 | 31 | 151–158 |
| E | 17 | 47–80 | 2 | 29 | 1 | 3 | 13 | 50–66 | 41 | 58–71 | 13 | 71–108 | 7 | 150 | 40 | 150–164 |
| F | 16 | 72–80 | — | 29 | 3 | 2 | 8 | 83–92 | 32 | 78–86 | 15 | 84–121 | 12 | 151 | 30 | 151–163 |
| G | 15 | 81–100 | 6 | 28 | 7 | 1 | 8 | 102–107 | 31 | 103–124 | 20 | 124–161 | — | — | 30 | 156–159 |
| H | 18 | 65–76 | 0 | — | 0 | 1 | 11 | 65–71 | 32 | 65–79 | 22 | 77–125 | 11 | 151 | 30 | 151–164 |

TABLE 2

| Example No. | Isopropanol Solution | | NaOH % | MCA % | Molar Stoichiometry | Weight Ratio Total Liquid/Dry Cellulose | Causticization Isopropanol Conc. | | 2 ppb. CMC in 4% CaCl$_2$ Apparent Viscosity/cp. |
|---|---|---|---|---|---|---|---|---|---|
| | % IPA | % Water | | | | | % IPA | % Water | |
| 1A | 86.9 | 13.1 | 99 | 50 | 1/2.03/1 | 5/1 | 86.9 | 13.1 | 16.5 |
| 2 | 86.9 | 13.1 | 99 | 50 | 1/2.03/1 | 5/1 | 86.9 | 13.1 | 13.5 |
| 3 | 86.9 | 13.1 | 99 | 50 | 1/2.05/1 | 5/1 | 86.9 | 13.1 | 11.0 |
| 4 | 85.4 | 14.6 | 99 | 50 | 1/2.05/1 | 5/1 | 85.4 | 14.6 | 11.5 |
| 5 | 96.4 | 3.6 | 50 | 50 | 1/2.02/1 | 5/1 | 86.9 | 13.1 | 19.0 |
| 6 | 86.9 | 13.1 | 99 | 80 | 1/2.03/1 | 5/1 | 86.9 | 13.1 | 10.5 |
| 7 | 96.2 | 3.8 | 50 | 80 | 1/2.03/1 | 5/1 | 86.9 | 13.1 | 13.0 |
| 8 | 86.9 | 13.1 | 99 | 50 | 1/2.05/1 | 5/1 | 86.9 | 13.1 | 16.5 |
| A | 86.9 | 13.1 | 99 | 50 | 1/2.05/1 | 5/1 | 86.9 | 13.1 | 5.0 |
| B | 86.9 | 13.1 | 99 | 50 | 1/2.03/1 | 5/1 | 86.9 | 13.1 | 2.5 |
| C | 77.0 | 23.0 | 99 | 50 | 1/2.05/1 | 5/1 | 77.0 | 23.0 | 2.0 |
| D | 94.0 | 6.0 | 99 | 50 | 1/2.05/1 | 5/1 | 94.0 | 6.0 | 2.0 |
| E | 86.9 | 13.1 | 48 | 50 | 1/2.05/1 | 5/1 | 84.5 | 15.5 | 2.0 |
| F | 86.9 | 13.1 | 99 | 50 | 1/2.00/1 | 5/1 | 86.9 | 13.1 | 2.0 |
| G | 86.9 | 13.1 | 99 | 50 | 1/2.03/1 | 5/1 | 86.9 | 13.1 | 7.5 |
| H | 86.9 | 13.1 | 99 | 50 | 1/2.03/1 | 5/1 | 86.9 | 13.1 | 2.0 |

Comparison of the data in Tables 1 and 2 indicate the following:

(1) Examples 1, 2, A, B—The type of cellulose suitable for the preparation of CMC having superior viscosity characteristics in calcium chloride solutions is very critical. The cellulose must be of high molecular weight and must not have undergone sufficient chemical or mechanical degradation to substantially reduce the rheological characteristics of the CMC. Any cellulose which produces a CMC which exhibits an API RP 13B apparent viscosity greater than about 10.0 cp when 35° C. in order to obtain a CMC having superior rheological characteristics in calcium chloride solutions; and (6) Examples 1A, H—The CMC must be prepared in the absence of oxygen so as to eliminate the oxidative degradation of the cellulose.

The rheological characteristics of the CMC samples from Example 1A and 1B were compared with those of several commercial CMC products in a 4% calcium chloride solution. The data obtained, given in Table 3 below, indicate the superior viscosification properties of the CMC produced by the process of this invention.

TABLE 3

Performance of Various CMC in 4% CaCl$_2$ Solution

| Sample Mark | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| High Viscosity CMC, lb./bbl. | | | | | | | | | | | | | | |
| Example 1A | 2.0 | 3.0 | 0 | 0 | 0 | 0 | 0 | 0 | 0 | 0 | 0 | 0 | 0 | 0 |
| Example 1B | 0 | 0 | 1.5 | 2.0 | 0 | 0 | 0 | 0 | 0 | 0 | 0 | 0 | 0 | 0 |
| DRISPAC | 0 | 0 | 0 | 0 | 6.0 | 8.0 | 0 | 0 | 0 | 0 | 0 | 0 | 0 | 0 |
| AKU STAFLO | 0 | 0 | 0 | 0 | 0 | 0 | 6.0 | 8.0 | 0 | 0 | 0 | 0 | 0 | 0 |
| Gabrosa HVT-70 | 0 | 0 | 0 | 0 | 0 | 0 | 0 | 0 | 2.0 | 3.0 | 0 | 0 | 0 | 0 |
| Gabrosa DM-3000 | 0 | 0 | 0 | 0 | 0 | 0 | 0 | 0 | 0 | 0 | 4.0 | 6.0 | 0 | 0 |
| HV CELLEX | 0 | 0 | 0 | 0 | 0 | 0 | 0 | 0 | 0 | 0 | 0 | 0 | 4.0 | 6.0 |
| Properties After Stirring 20 Minutes, and Rolling at 74° F. for 16 Hours | | | | | | | | | | | | | | |
| Apparent Viscosity, cp. | 15 | 27 | 13.5 | 19 | 8 | 18 | 10 | 27 | 7.5 | 16 | 7 | 18.5 | 12 | 38 |
| Plastic Viscosity, cp. | 10 | 14 | 10 | 13 | 7 | 17 | 9 | 20 | 6 | 12 | 6 | 15 | 11 | 29 |
| Yield Point, lb/100 sq.ft. | 10 | 26 | 7 | 12 | 1 | 2 | 2 | 14 | 3 | 8 | 2 | 7 | 2 | 18 |
| pH | 7.2 | 8.3 | 6.6 | 7.3 | 7.5 | 7.6 | 7.7 | 7.7 | 7.7 | 7.6 | 8.0 | 8.0 | 7.6 | 8.0 |
| Drilling Fluid Yield, bbl/ton | | 1000 | | 1210 | | 260 | | 290 | | 680 | | 360 | | 460 |

The rheological characteristics of the CMC from Example 1A were compared with those of DRISPAC, a purified premium grade CMC, by mixing these CMC products in aqueous solutions containing various concentrations of calcium chloride. The data, given in Table 4 below, indicate the superior viscosification properties of the CMC of this invention at all concentrations of calcium chloride. As the data in Table 4 also indicate, the aqueous solutions containing from about 10 to about 35 weight percent CaCl$_2$, preferably from about 12 to about 32%, exhibit higher viscosities than the other CaCl$_2$ solutions containing the CMC of this invention. Indeed, the data indicate that aqueous solutions containing between 20% and 30% by weight CaCl$_2$ possess superior thermal stability.

TABLE 4

Effect of Calcium Chloride Concentration
4 ppb. CMC in Various CaCl$_2$ Solutions
Apparent Viscosity, cp.

| | Example 1A | | | DRISPAC | | |
|---|---|---|---|---|---|---|
| CaCl$_2$ | Initial | 150° F. | Final | Initial | 150° F. | Final |
| 0 | 78.5 | 47.5 | 77 | 121 | 62.5 | 108 |
| 2 | 58 | 4.5 | 48 | 5.5 | 1 | 4 |
| 4 | 47 | 5 | 40 | 3 | 1.5 | 2.5 |
| 5 | 45.5 | 6.5 | 40 | 3 | 1 | 2.5 |
| 6 | 46.5 | 8 | 41 | 3 | 1.5 | 3 |
| 8 | 52 | 15.5 | 48 | 3.5 | 1.5 | 3 |
| 10 | 55.5 | 21.5 | 52.5 | 4.5 | 2 | 4 |
| 15 | 74.5 | 42.5 | 73.5 | 11.5 | 3.5 | 9.5 |
| 20 | 85 | 55 | 86 | 26 | 7.5 | 2.4 |
| 30 | 63 | 81.5 | 70 | 4 | 27.5 | 16 |
| 37 | 32 | 88 | 44.5 | 4.5 | 11.5 | 9.5 |

The aqueous calcium chloride solutions containing the CMC samples indicated in Table 4 were admixed with 50 ppb. of Glen Rose shale, rolled for 16 hours at 150° F., cooled to room temperature, and evaluated for API RP 13B fluid loss. The data obtained, given in Table 5, indicate the superior fluid loss control characteristics of the CMC of this invention in calcium chloride solutions.

TABLE 5

Effect of CaCl$_2$ Concentration After Shale Contamination
50 lb/bbl GlenRose Shale

| 4 lb/bbl CMC | % CaCl$_2$ | pH | API Filtrate ml. |
|---|---|---|---|
| Example 1A | 0 | 8.2 | 6.0 |
| | 2 | 7.2 | 11.6 |

TABLE 5-continued

Effect of CaCl$_2$ Concentration After Shale Contamination
50 lb/bbl GlenRose Shale

| 4 lb/bbl CMC | % CaCl$_2$ | pH | API Filtrate ml. |
|---|---|---|---|
| | 4 | 7.0 | 12.0 |
| | 8 | 6.8 | 10.2 |
| | 10 | 6.6 | 9.6 |
| | 15 | 6.4 | 8.6 |
| | 20 | 6.2 | 15.2 |
| | 30 | 5.7 | 7.5 |
| | 37 | 5.3 | 2.8 |
| DRISPAC | 0 | 8.4 | 7.3 |
| | 2 | 7.2 | 166 |
| | 4 | 7.0 | 272 |
| | 8 | 6.8 | 268 |
| | 10 | 6.6 | 286 |
| | 15 | 6.4 | 228 |
| | 20 | 6.3 | 120 |
| | 30 | 5.6 | 70 |
| | 37 | 5.5 | 136 |

The effect of pH on the rheological characteristics of the CMC of this invention was investigated by adjusting the initial pH of a 4% CaCl$_2$ solution with NaOH and mixing 4 ppb. CMC therewith. DRISPAC, a commercial CMC, was similarly evaluated. The data obtained, given in Table 6, indicate that the pH of the calcium chloride solution must be less than about 11.0, preferably less than about 10.0, to obtain the superior rheological characteristics of the CMC produced by the process of the present invention.

TABLE 6

Effect of pH on the Viscosity of CMC in 4% CaCl$_2$
4 lb/bbl CMC in 4% CaCl$_2$ Solution

| CMC | Initial pH | Apparent Viscosity cp. | Plastic Viscosity cp. | Yield Point lb/100 sq. ft. | Final pH |
|---|---|---|---|---|---|
| Example 1A | 7.0 | 57 | 22 | 70 | 7.2 |
| | 8.5 | 54 | 20 | 67 | 7.4 |
| | 10.5 | 52 | 21 | 61 | 8.2 |
| | 10.7 | 39 | 17 | 43 | 9.7 |
| | 11.0 | 5.5 | 2 | 7 | 10.2 |
| | 11.5 | 2.5 | 2.5 | 0 | 11.0 |
| DRISPAC | 7.0 | 3.5 | 3 | 1 | 7.1 |
| | 8.5 | 3.5 | 3 | 1 | 7.3 |
| | 10.5 | 3 | 2 | 2 | 8.4 |
| | 11.5 | 2 | 1.5 | 1 | 10.9 |

We claim:

1. In a process for preparing an alkali metal salt of carboxymethyl cellulose comprising forming an alkali cellulose in a solution of isopropanol and water and thereafter adding monochloroacetic acid to form the carboxymethyl cellulose ether, the improvement which comprises conducting the causticization of high molecular weight cellulose in the absence of air at a temperature less than about 35° C. in an aqueous solution containing from 84.9% to 88.9% by weight isopropanol, and at an isopropanol-water solution: cellulose weight ratio from about 2:1 to about 7.5:1, wherein the amount of alkali metal hydroxide utilized to form the alkali cellulose is such that the alkali metal hydroxide to monochloroacetic acid molar ratio during the subsequent carboxymethylation of the cellulose is greater than 2.00 to 1, and wherein the monochloroacetic acid contains less than 2% by weight of dichloroacetic acid, whereby there is produced an alkali metal salt of carboxymethyl cellulose.

2. The process of claim 1 wherein said aqueous solution contains from 85% to 88% isopropanol, wherein said isopropanol-water solution:cellulose weight ratio is from about 3:1 to 6:1, wherein said alkali metal hydroxide to monochloroacetic acid molar ratio is from about 2.03:1 to about 2.1:1, wherein said alkali metal hydroxide is sodium hydroxide, and wherein the molar ratio of dry cellulose:sodium hydroxide:monochloroacetic acid is in the range from about one part dry cellulose to 1.725–2.415 parts sodium hydroxide to 0.85–1.15 parts monochloroacetic acid.

3. The process for preparing an alkali metal salt of carboxymethyl cellulose which comprises:
(a) intensively shearing and agitating a mixture of high molecular weight cellulose, isopropanol and water for a period of time sufficient to form a slurry of swollen cellulose;
(b) removing the oxygen from the reaction vessel;
(c) pressurizing the reaction vessel with an inert gas;
(d) adding alkali metal hydroxide while maintaining the temperature of the aqueous isopropanol solution less than about 35° C.;
(e) reacting the alkali hydroxide with the cellulose for a period of time sufficient to form alkali cellulose while maintaining the temperature of the aqueous isopropanol solution at less than about 35° C.;
(f) adding monochloroacetic acid and conducting the carboxymethylation of the cellulose at a temperature in the range from about 55° C. to about 90° C. for a period of time sufficient to form the alkali metal salt of carboxymethyl cellulose;
(g) removing isopropanol from the vessel by azeotropic distillation; and
(h) drying and pulverizing the alkali metal salt of carboxymethyl cellulose;
wherein the concentration of isopropanol in the aqueous isopropanol solution in step (e) is from 84.9% to 88.9% by weight, wherein the aqueous isopropanol solution to cellulose weight ratio in step (f) is from B 2:1 to 7.5:1, wherein the amount of alkali metal hydroxide in step (d) is such that the alkali metal hydroxide to monochloroacetic acid molar ratio in step (f) is greater than 2:00 to 1, wherein the monochloroacetic acid contains less than about 2% by weight of dichloroacetic acid, and wherein the molar ratio of dry cellulose:alkali metal hydroxide:monochloroacetic acid in step (f) is in the range from about one part dry cellulose to 1.725–2.415 parts sodium hydroxide to 0.85–1.15 parts monochloroacetic acid.

4. The process of claim 3 wherein said alkali metal hydroxide is sodium hydroxide.

5. The process of claim 4 wherein the aqueous isopropanol solution of step (a) contains greater than 90% by weight isopropanol and water is added in step (d) to form aqueous isopropanol solution in step (e) having the required concentration of isopropanol.

6. The process of claim 3 wherein said alkali metal hydroxide is sodium hydroxide, wherein the concentration of isopropanol in the aqueous isopropanol solution in step (e) is from 85% to 88% by weight, wherein the molar ratio of sodium hydroxide to monochloroacetic acid in step (f) is in the range from about 2.03:1 to about 2.1:1.

7. The process of claims 1, 2, 3, 4, 5 or 6 wherein the concentration of isopropanol in the aqueous isopropanol solution is 86.9% by weight.

8. The alkali metal salt of carboxymethyl cellulose produced by the process of claim 7.

9. The alkali metal salt of carboxymethyl cellulose produced by the process of claims 1, 2, 3, 4, 5 or 6.